(12) United States Patent
Bobuk et al.

(10) Patent No.: US 8,142,229 B1
(45) Date of Patent: Mar. 27, 2012

(54) CARD CONNECTOR WITH CAM FEATURE FOR FACILITATING INSERTION OF A CARD

(75) Inventors: Aaron Michael Bobuk, Bellevue, WA (US); Terrance F. Little, York, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 13/180,593

(22) Filed: Jul. 12, 2011

(51) Int. Cl.
*H01R 24/00* (2006.01)

(52) U.S. Cl. ........................................ 439/630

(58) Field of Classification Search ............... 439/159, 439/160, 630
See application file for complete search history.

(56) References Cited

U.S. PATENT DOCUMENTS

| | | | |
|---|---|---|---|
| 6,261,128 B1 * | 7/2001 | Heim et al. | 439/630 |
| 7,575,452 B2 * | 8/2009 | Chikashige et al. | 439/159 |
| 7,901,225 B2 * | 3/2011 | Maruyama | 439/159 |
| 2010/0087074 A1 | 4/2010 | Yu et al. | |

* cited by examiner

*Primary Examiner* — Tho D Ta
(74) *Attorney, Agent, or Firm* — Ming Chieh Chang; Wei Te Chung; Andrew C. Cheng

(57) ABSTRACT

A card connector (100) defining a card receiving space, includes an insulative housing (2), a number of contacts (3) retained in the insulative housing, a slider (41) moveably assembled on the insulative housing, and a spring (42) compressed between the insulative housing and the slider. The insulative housing has an elastic rear latch (232) and a cam block (231) attached below the rear latch. The slider has a main portion (411) and an extension portion (412) protruding rearward from the main portion. The extension portion has a bearing surface (4121) for deflecting the cam block. The rear latch together with the cam block is deflected away from the card receiving space by the bearing surface when the slider is at an original rear position.

20 Claims, 9 Drawing Sheets

US 8,142,229 B1

CARD CONNECTOR WITH CAM FEATURE FOR FACILITATING INSERTION OF A CARD

CROSS-REFERENCE TO RELATED APPLICATIONS

This patent application relates to a U.S. patent application Ser. No. 13/158,505, filed on 2011 Jun. 13, entitled "CARD CONNECTOR WITH REAR LATCH", which is assigned to the same assignee as this application.

BACKGROUND OF THE INVENTION

1. Field of the Invention

The present invention relates generally to a card connector, and more particularly to a card connector facilitating insertion of a card.

2. Description of Related Arts

Micro SD (Security Digital) card standard is published by SD association. A micro SD card usually defines a side notch and a micro SD card connector is used for receiving the micro SD card. The micro SD card connector usually has an ejector comprising a slider, a spring, and a pin member for cooperatively ejecting the micro SD card. The micro SD card connector further comprises a card lock separately or integrally formed with the slider for securing with the side notch of the micro SD card. Presently, JEDEC (Joint Electronic Device Engineering Council) association is establishing a new UFS (Universal Flash Storage) card standard aiming at developing a faster memory card. A UFS card connector standard is asked for establishment accordingly.

UFS cards are designed to be normally used in portable devices, especially such as handsets, palmtop computers, or etc. A user usually would have to hold the device to which a UFS card connector is attached with one hand and insert a UFS card with the other hand. A flexible rear latch that the user would open with his or her finger to release the card has been developed in patent application of U.S. Pat. No. 39,127 by the same assignee. The UFS card initially begins to be inserted into a card receiving space, the front edge of the UFS card pushes the card lock of the rear latch outwardly and the flexible arm of the rear latch is deflected away from the card receiving space for giving away for the UFS card. Therefore, enough lead-in force must be provided on either the latch or the UFS card. Otherwise, the UFS card is obstructively inserted. The user may manually push on the rear latch to deflect away during the card's insertion, but there is no hand for the user to operate the rear latch. Actually, the card connector disclosed in patent application of U.S. Pat. No. 39,127 is difficult for insertion of the UFS card.

Hence, a card connector facilitating insertion of a card is desired.

SUMMARY OF THE INVENTION

Accordingly, an object of the present invention is to provide a card connector facilitating insertion of a card.

To achieve the above object, a card connector defining a card receiving space, includes an insulative housing, a number of contacts retained in the insulative housing, a slider moveably assembled on the insulative housing, and a spring compressed between the insulative housing and the slider. The insulative housing has an elastic rear latch and a cam block attached below the rear latch. The slider has a main portion and an extension portion protruding rearward from the main portion. The extension portion has a bearing surface for deflecting the cam block. The rear latch together with the cam block is deflected away from the card receiving space by the bearing surface when the slider is at an original rear position.

Other objects, advantages and novel features of the invention will become more apparent from the following detailed description when taken in conjunction with the accompanying drawings.

DETAILED DESCRIPTION OF THE PREFERRED EMBODIMENT

Figure 1:
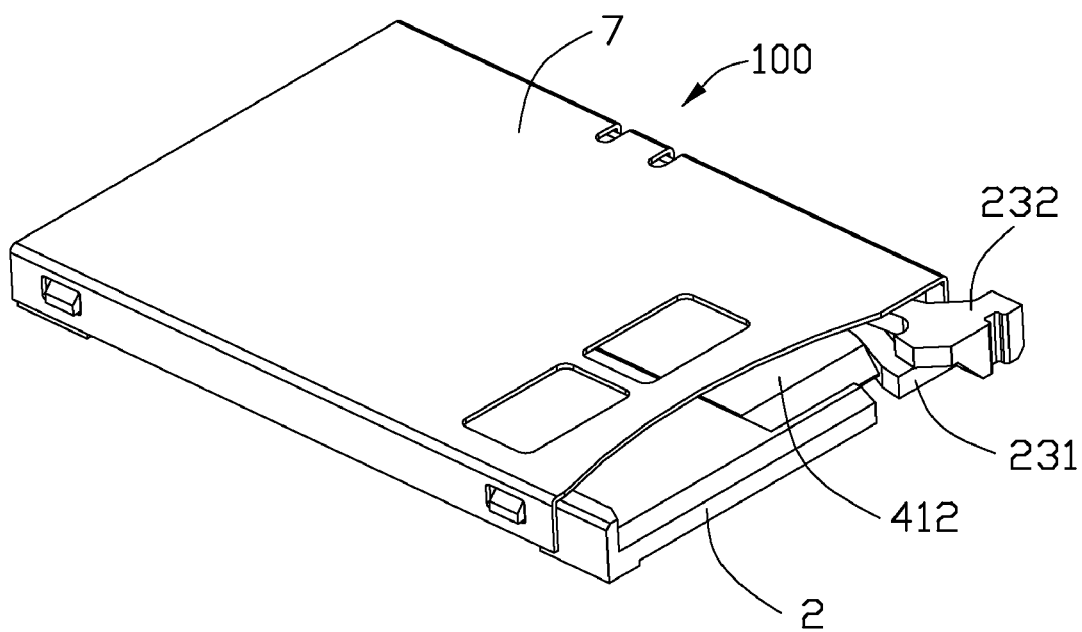
FIG. 1 is a perspective, assembled view of a card connector constructed in accordance with the present invention.

Reference will now be made in detail to the preferred embodiment of the present invention.

Referring to FIGS. 1-9, a card connector 100 in accordance with the present invention used for receiving an electrical card 5, comprises an insulative housing 2, a plurality of contacts 3 received in the insulative housing 2 along a card insertion direction, a slider 41 moveably assembled on the insulative housing 2, and a spring 42 sandwiched between the insulative housing 2 and the slider 41 for urging the slider 41 along a card ejection direction. The card connector 100 further comprises a metal shell 7 covering the insulative housing 2 for shielding.

Figure 2:
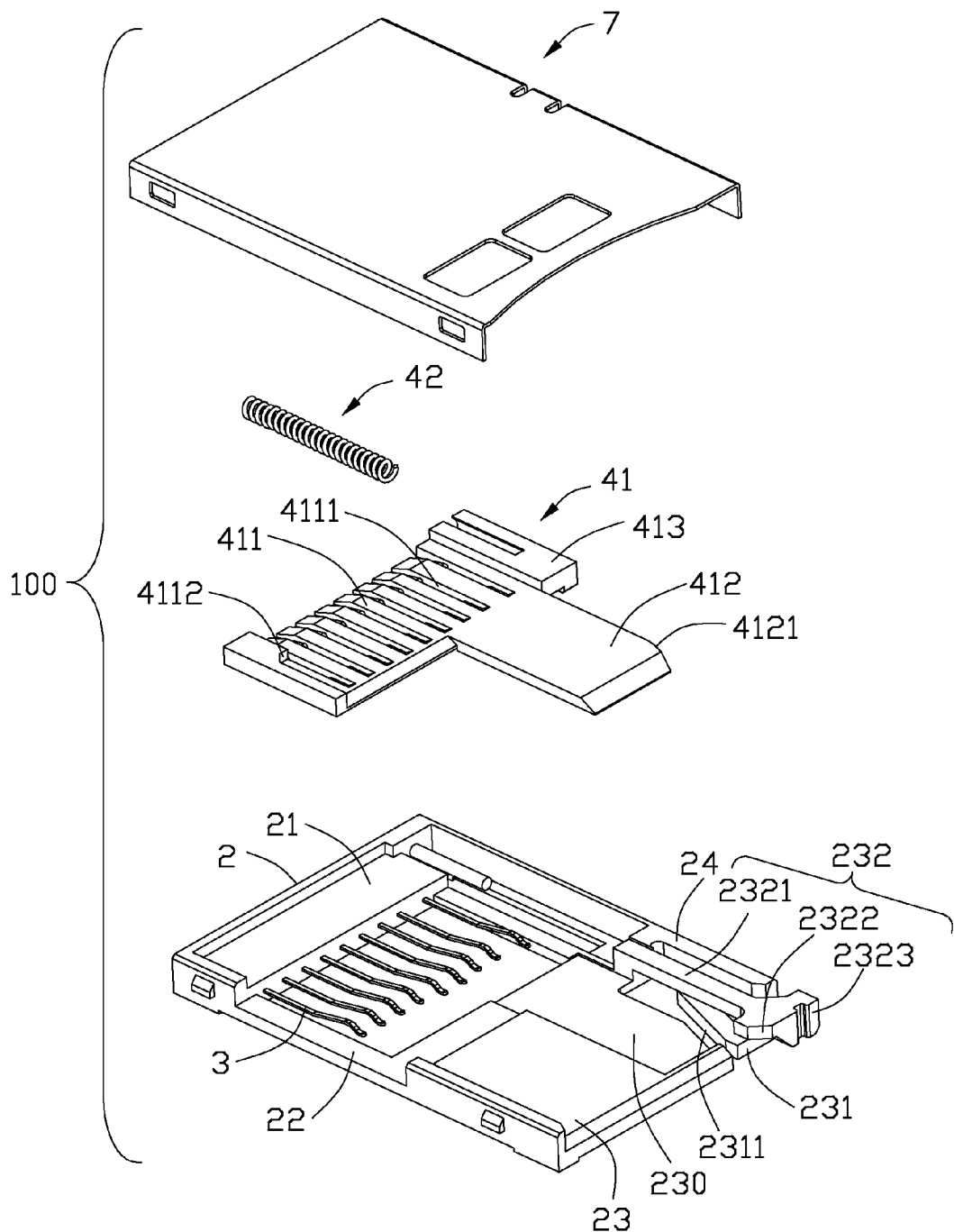
FIG. 2 is a perspective, exploded view of the card connector.
Figure 3:
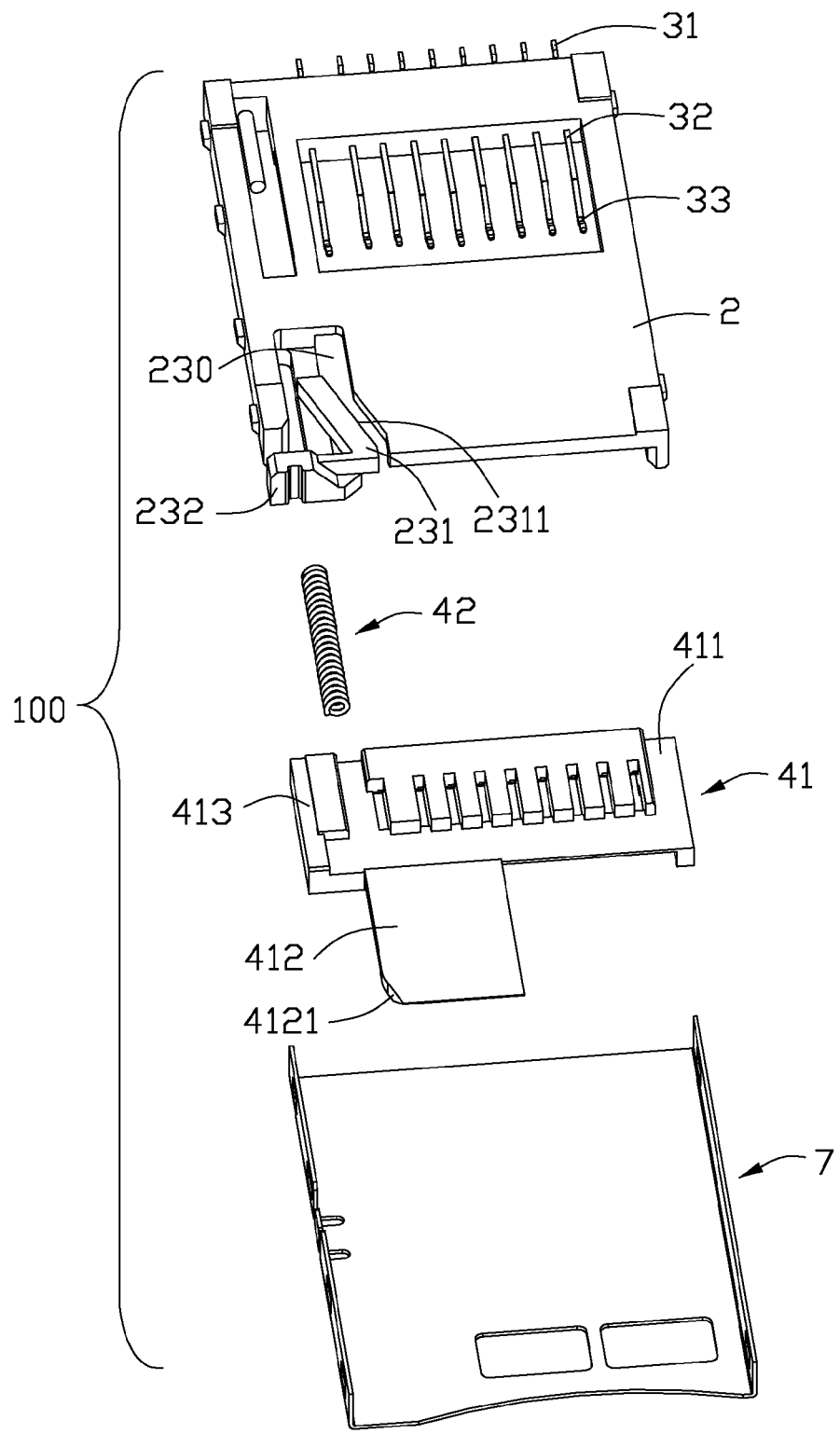
FIG. 3 is another perspective, exploded view of the card connector.
Figure 4:
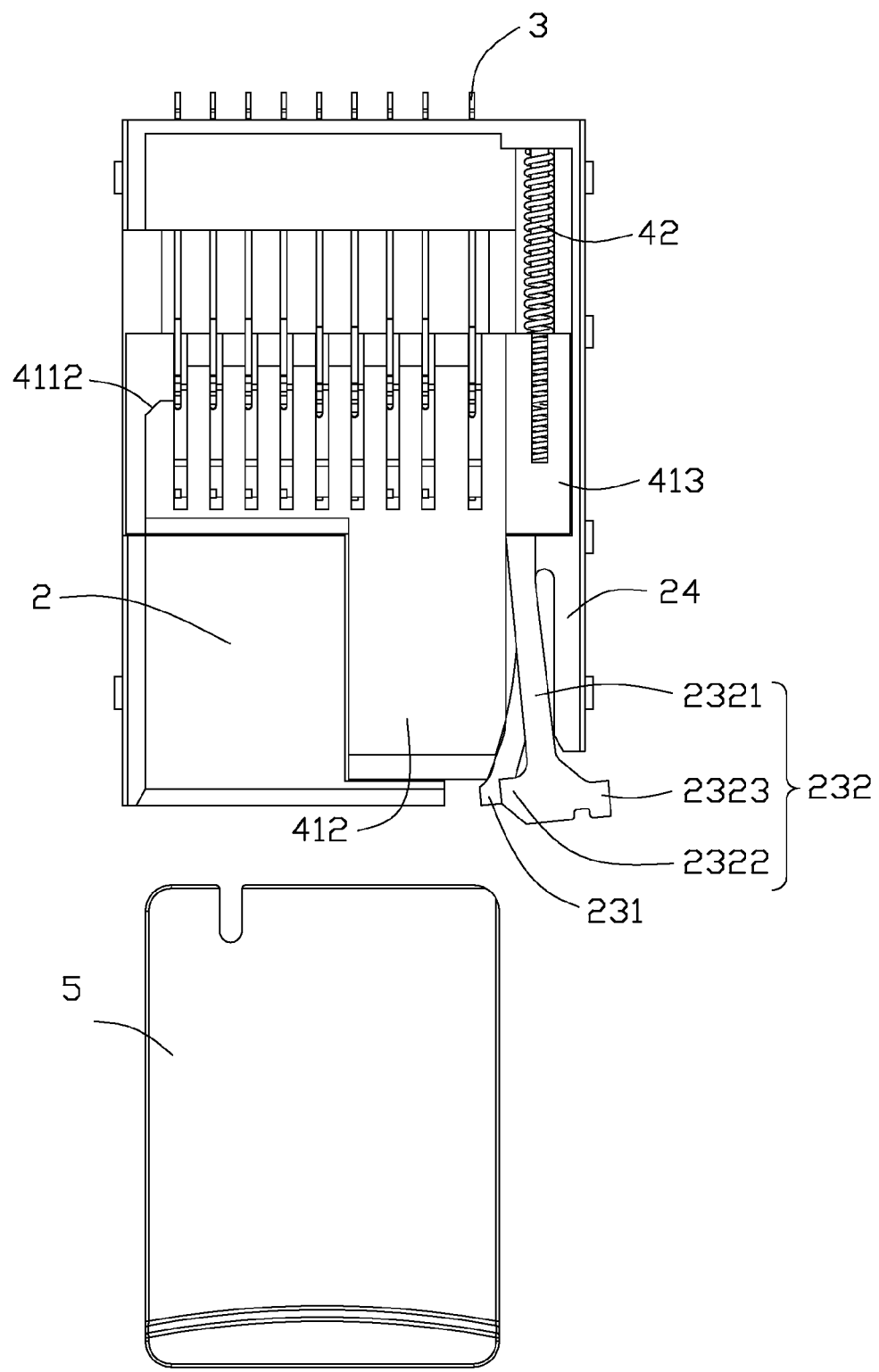
FIG. 4 is a first top plan view of the card connector when a top cover is removed and a card is not inserted therein.
Figure 5:
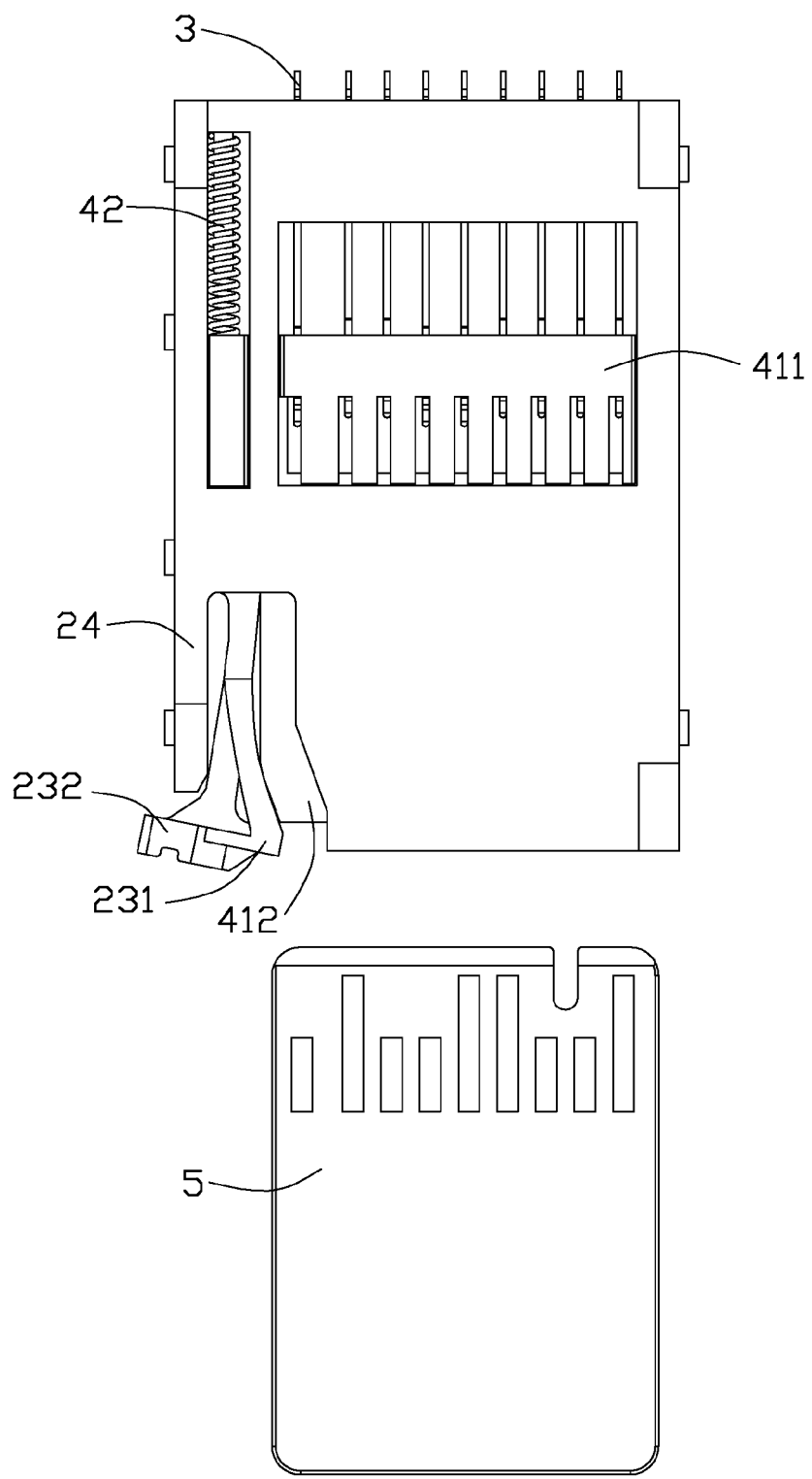
FIG. 5 is a bottom plan view of FIG. 4.
Figure 6:
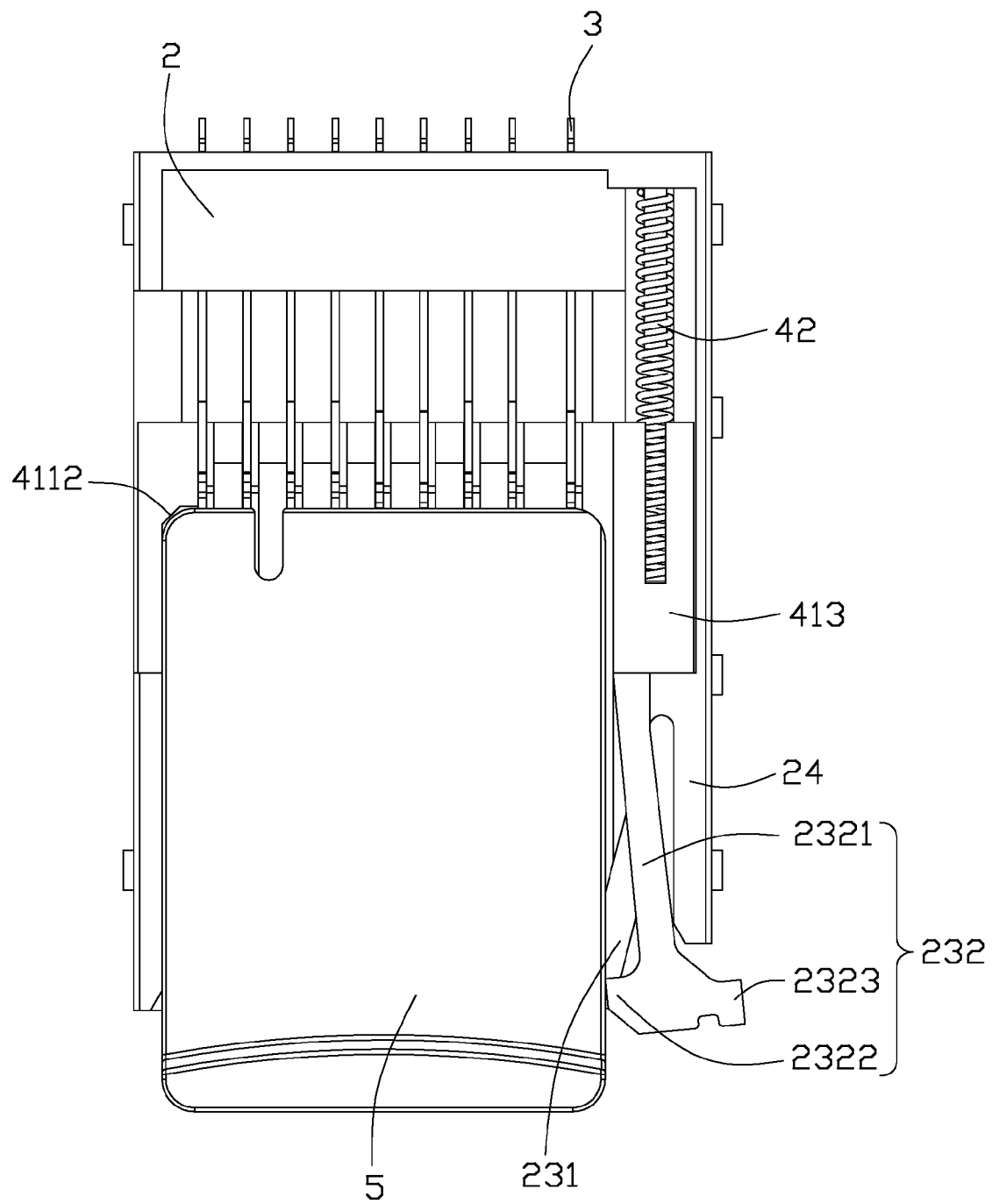
FIG. 6 is a second top plan view of the card connector when the card is initially inserted and begins to move the slider along the card insertion direction.
Figure 7:
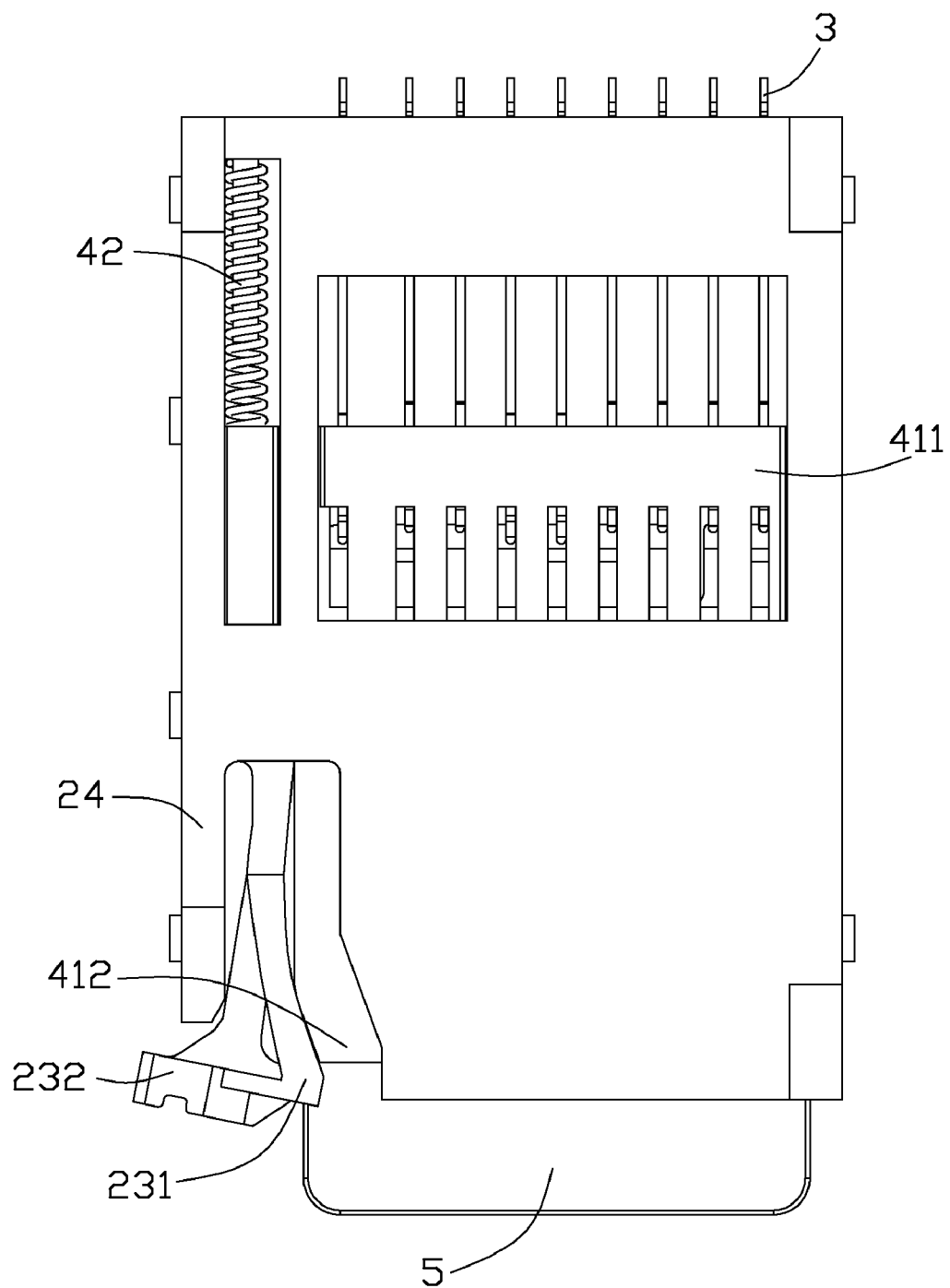
FIG. 7 is a bottom plan view of FIG. 6.
Figure 8:
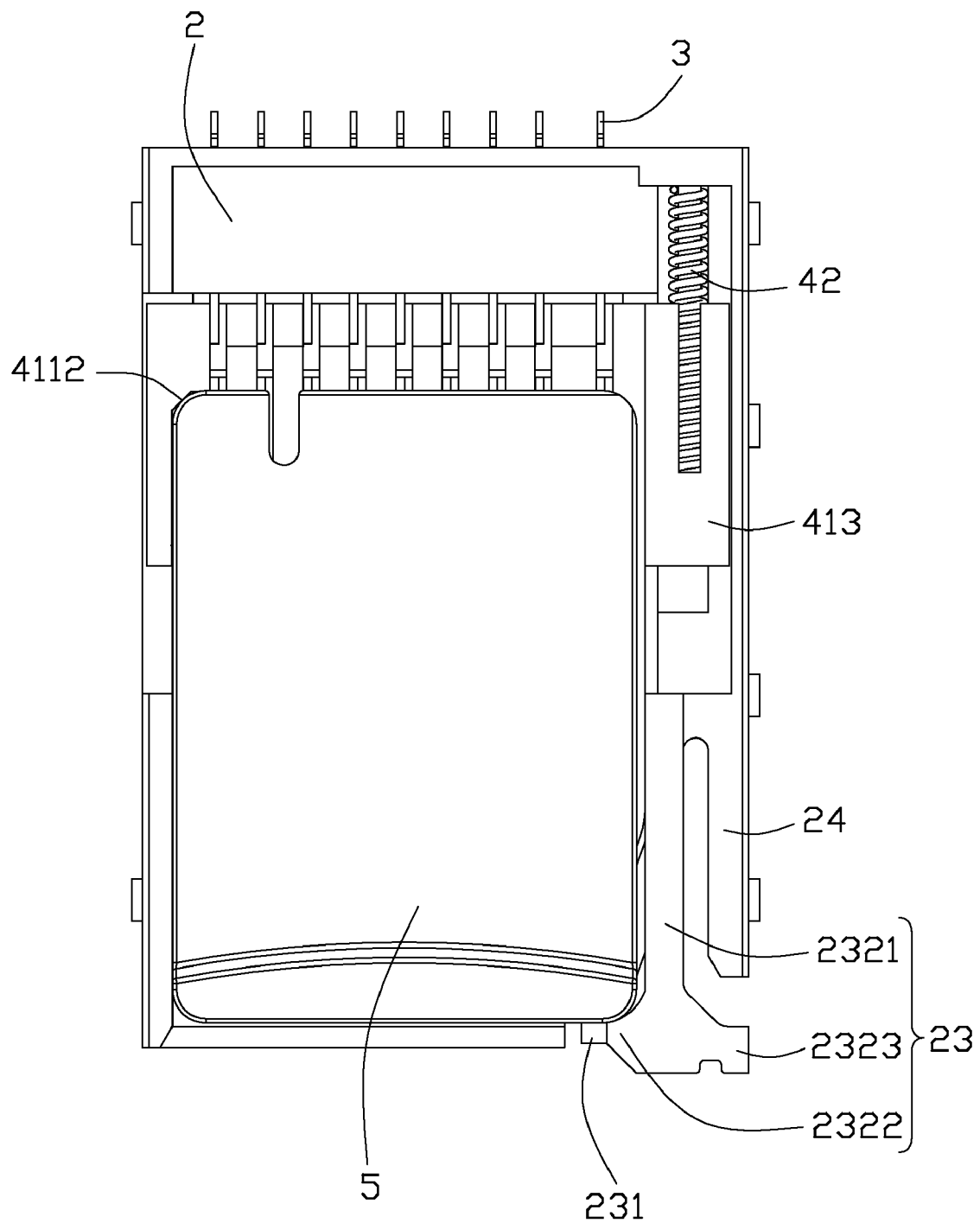
FIG. 8 is a third top plan view of the card connector when the card is fully inserted.
Figure 9:
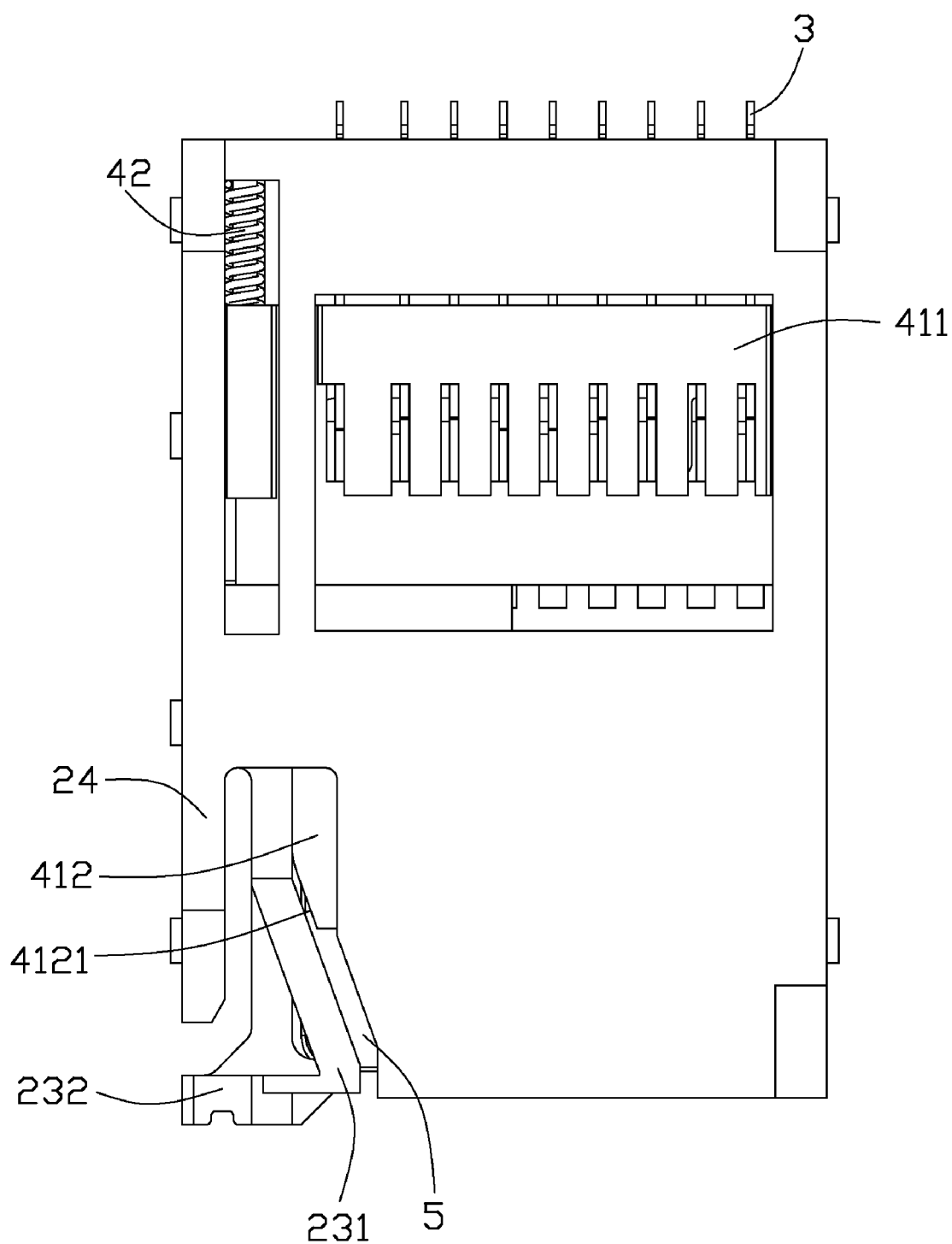
FIG. 9 is a bottom plan view of FIG. 8.

Referring to FIGS. 2 and 3, the insulative housing 2 comprises a front retaining portion 21, a middle supporting portion 22, and a rear securing portion 23 positioned along the card insertion/ejection direction. The contacts 3 have a plurality of soldering portions 31 extending out of the insulative housing 2, a plurality of connecting portions 32 retained in the retaining portion 21, and a plurality of contacting portions 33 extending rearward upwardly towards the supporting portion 22. The slider 41 comprises a main portion 411 assembled on the supporting portion 22 and an extension portion 412 protruding rearward from the main portion 411. The extension portion 412 is assembled on the securing portion 23 and is movable on the securing portion 23 along with the forward movement of the main portion 411 on the supporting portion 22. The slider 41 and the insulative housing 2 together define a card receiving space (not labeled). The insulative housing 2 defines an elongated cutout 230 on the securing portion 23 and forms a cam block 231 extending into the cutout 230. The insulative housing 2 forms an elastic rear latch 232 deflectable away from or towards the card receiving space. The rear latch 232 comprises a flexible arm 2321 integral with the insulative housing 2, a card lock 2322 inwardly formed at the free end of the flexible arm 2321, and an operating portion 2323 formed at the free end of the flexible arm 2321 which is opposite to the card lock 2322. The cam block 231 is integral below the rear latch 232. The cam block 231 comprises an inner curved cam surface 2311. The extension portion 412 is received in the cutout 230 and comprises a bearing surface 4121 interfering with the cam surface 2311 for deflecting the cam block 231 together with the rear latch 232 when the slider 41 is at an original rear position, at which the flexible arm 2321 is deflected and the card lock 2322 gives away to the electrical card 5. The bearing surface 4121 is separated from the cam surface 2311 when slider 41 moves to a final frontal position, at which the flexible arm 2321 releases its elasticity, returns back to its initial position, and the card lock 2322 is capable of being secured with a rear edge of the electrical card 5. The insulative housing 2 has a sidewall 24 besides the cutout 230 for preventing the rear latch 232 being over-deflected.

Referring to FIGS. 2 and 3, the main portion 411 of the slider 41 defines a plurality of recesses 4111 on an upper surface thereof. The recesses 4111 extend along the card insertion/ejection direction for receiving the corresponding contacting portions 33 of the contacts 3. The slider 41 comprises a confronting portion 4112 at a front side of the main portion 411. In a preferred embodiment, the confronting portion 4112 and the card lock 2322 are diagonally positioned. The electrical card 5 pushes the confronting portion 4112 for moving the slider 41 along the card insertion direction and the confronting portion 4112 reversely pushes the electrical card 5 to move along the card ejection direction. The slider 41 further comprises a positioning portion 413 beside the main portion 411 and frontal of the rear latch 232. The spring 42 is positioned between the retaining portion 21 of the insulative housing 2 and the positioning portion 413 of the slider 41 to retain the slider 41 at the original rear position. During the movement of the slider 41 along the card insertion direction, the spring 42 is compressed to have elasticity. The elasticity of the spring 42 can be released and therefore, the spring 42 urges the slider 41 to move along the card ejection direction.

Referring to FIGS. 4-9, showing a process that the electrical card 5 is inserted into the card receiving space. Before the electrical card 5 is inserted into the card receiving space, because the rear latch 432 is deflected away from the card receiving space via interference between the bearing surface 4121 and the cam surface 2311, the card lock 2322 gives away for the electrical card 5. Therefore, the electrical card 5 is inserted into the card receiving space without obstacle. When the electrical card 5 is inserted as FIGS. 6 and 7, the electrical card 5 confronts the confronting portion 4112 of the slider 41 and begins to move the slider 41 along the card insertion direction. The spring 42 becomes compressed and has elasticity. When the electrical card 5 is fully inserted as FIGS. 8 and 9, because the bearing surface 4121 is separated from the cam surface 2311, the rear latch 232 returns back to its initial position and the card lock 2322 is secured with the rear edge of the electrical card 5. The contacting portions 33 of the contacts 3 are raised upwardly for connecting with the electrical card 5. When the electrical card 5 is ejected, a user pushed the operating portion 2323 outwardly by a finger and the rear latch 232 is deflected outwardly. The card lock 2322 discharges the rear edge of the electrical card 5. The cam block 231 moves sideward along with the rear latch 232. The elasticity of the spring 42 is released for ejecting the card 5. The bearing surface 4121 returns backs to bear against the cam surface 2311 again and keeps the rear latch 232 in deflection.

In the card connector 100 of the present invention, because the rear latch 232 is deflected away for giving away the electrical card 5 via interference between the bearing surface 4121 of the slider 412 and the cam surface 2311 of the insulative housing 2, the electrical card 5 is facilitated to be inserted into the card receiving space. Therefore, the user is capable of holding the device to which the card connector 100 is attached with one hand and inserting the electrical card 5 with the other hand. It is easily operated.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector defining a card receiving space, comprising:
    an insulative housing having an elastic rear latch and a cam block attached below the rear latch;
    a plurality of contacts retained in the insulative housing;
    a slider moveably assembled on the insulative housing, the slider having a main portion and an extension portion protruding rearward from the main portion, the extension portion having a bearing surface for deflecting the cam block, wherein the rear latch together with the cam block is deflected away from the card receiving space by the bearing surface when the slider is at an original rear position; and
    a spring compressed between the insulative housing and the slider to retain the slider at the original rear position.

2. The card connector as claimed in claim 1, wherein the bearing surface is separated from the cam block when the slider moves to a final frontal position, at which the rear latch releases its elasticity and returns back to its initial position.

3. The card connector as claimed in claim 2, wherein the insulative housing defines a cutout and the extension portion extends into the cutout.

4. The card connector as claimed in claim 3, wherein the cam block is received in the cutout.

5. The card connector as claimed in claim 4, wherein the insulative housing has a sidewall beside the cutout and the sidewall conflicts with the cam block when the rear latch is deflected.

6. The card connector as claimed in claim 2, wherein the rear latch comprises a flexible arm integral with the insulative housing, a card lock inwardly formed at the free end of the flexible arm, and an operating portion formed at the free end of the flexible arm which is opposite to the card lock.

7. The card connector as claimed in claim 6, wherein the card lock is capable of securing a rear edge of an inserted card.

8. The card connector as claimed in claim 7, wherein the main portion comprises a confronting portion and a front edge of the card pushes the confronting portion for moving the slider along a card insertion direction and the slider reversely pushes the card to move along a card ejection direction.

9. The card connector as claimed in claim 8, wherein the confronting portion and the card lock are diagonally positioned.

10. The card connector as claimed in claim 8, wherein the slider comprises a positioning portion beside the main portion and the positioning portion is positioned between the spring and the rear latch.

11. A card connector for use with an electronic card, comprising:
    an insulative housing defining a card receiving space;
    a plurality of contacts disposed in the housing with contacting sections extending toward the card receiving space;

a latch disposed on the housing and positioned and configured to be adapted to lock an edge of the electronic card, said latch being associated with a cam block in response to movement of the cam block; and a slider back and forth moveable relative to the housing in a front-to-back direction between front and rear positions, said slider defining an extension portion corresponding to the cam block; wherein when the slider is located at the rear position, the extension portion results in the cam block having the latch in an unlocking location where the electronic card can freely move without locking on the edge thereof; when the slider is at the front position, the extension portion results in the cam block having the latch in a locking location where rear edge of the electronic card is locked.

12. The card connector as claimed in claim 11, wherein the slider urges the contact to be deflected during back and forth movement of the slider.

13. The card connector as claimed in claim 11, wherein when the slider is located in the rear position, the extension portion urges the cam block to have the latch deflected outwardly.

14. The card connector as claimed in claim 11, wherein when the slider is located in the front position, the extension portion is disengaged from the cam block to have the latch resume to an original position without deflection.

15. The card connector as claimed in claim 11, wherein said edge is a rear edge of the electronic card.

16. The card connector as claimed in claim 11, wherein the cam block is located at a level below the latch.

17. A card connector for use with an electronic card, comprising:

an insulative housing defining a card receiving space;

a plurality of contacts disposed in the housing with contacting sections extending toward the card receiving space;

a moveable latch positioned and configured for locking a rear edge of the electronic card when said electronic card is received in the card receiving space;

a slider back and forth moveable relative to the housing between front and rear positions; and an actuation device operated between the slider and the latch, and essentially actuated by movement of the slider and actuating deflection of the latch; wherein when said slider is located in the front position, the latch is at a locking position; when the slider is located in the rear position, the latch is at an unlocking position.

18. The card connector as claimed in claim 17, wherein said actuation device includes a cam block associated with the latch to deflect the latch for defining said locking and said unlocking positions of the latch.

19. The card connector as claimed in claim 18, wherein said actuation device further includes an extension portion on the slider to confront the cam block so as to have the cam block be constantly in response to movement of the extension portion under condition that the extension portion deflects the cam block when the slider is located in the rear position, and releases the cam block when the slider is located in the front position.

20. The card connector as claimed in claim 17, wherein the latch is essentially located a fixed position of the housing.

* * * * *